March 29, 1927.
W. B. BASTIAN
1,622,820
GAS BURNER
Filed June 30, 1926
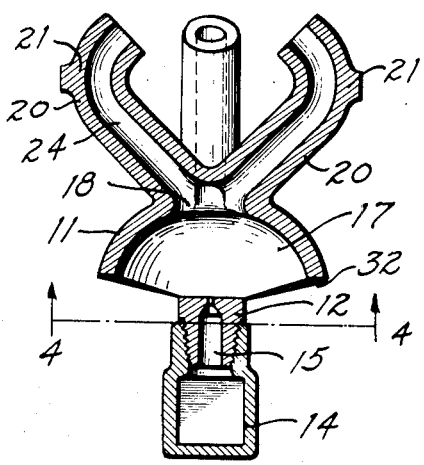
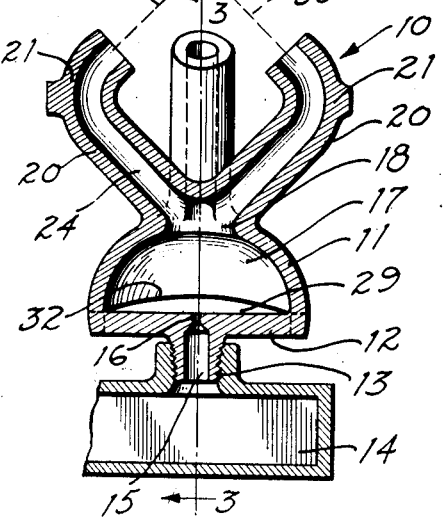
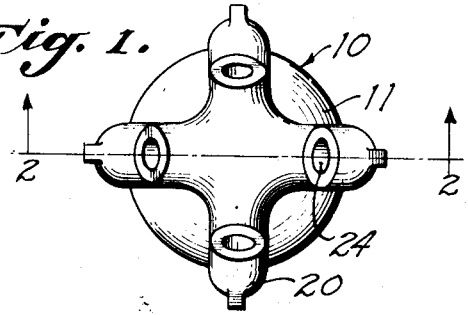
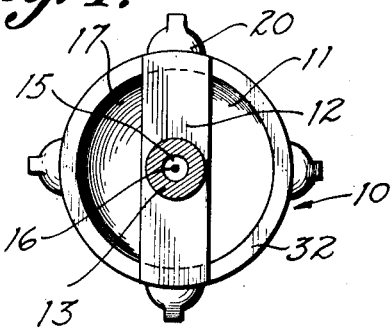
INVENTOR:
WILLIAM B. BASTIAN,
BY
Ford W Lewis
ATTORNEY.

Patented Mar. 29, 1927.

1,622,820

UNITED STATES PATENT OFFICE.

WILLIAM B. BASTIAN, OF LOS ANGELES, CALIFORNIA.

GAS BURNER.

Application filed June 30, 1926. Serial No. 119,572.

My invention relates to gas burners, but more particularly to a novel combined gas and air mixer and burner.

In gas burners as commonly used in cook stoves, water heaters, and other domestic appliances, gas and air are mixed in a mixing chamber and then the mixture is projected from a number of jets to burn in a series of separate flames. In such burners any carbon monoxide in the gas is not burned in the individual flames due to the carbon monoxide requiring a higher temperature for combustion than is provided in these flames. As well known, carbon monoxide is a very poisonous gas and its escape in this manner is a constant source of danger.

It is therefore a broad object of my invention to provide a gas burner for domestic use in which all of the gas will be subjected to such a high temperature as to insure that the carbon monoxide and other gases requiring an unusually high temperature for combustion will be completely consumed.

It is a further object to provide a gas burner in which the mixture of gas and air is raised to a high temperature due to the converging of a plurality of jets of burning gas at a single point.

It is another object of my invention to provide a gas burner having a gas and air mixer incorporated therewith in such a manner that if the gas burns in the mixer it may be readily seen from a point on a level with the burner.

Other objects and advantages will be made manifest in the following description and accompanying drawing in which, Fig. 1 is a view showing in plan a preferred embodiment of the gas burner of my invention.

Fig. 2 is a vertical medial sectional view taken on the line 2—2 of Fig. 1.

Fig. 3 is a vertical medial sectional view taken on the line 3—3 of Fig. 2.

Fig. 4 is a horizontal sectional view taken on the line 4—4 of Fig. 3.

In the preferred form of my invention, illustrated in Figs. 1, 2 and 3, the numeral 10 indicates a gas burner which is in the form of a single casting. The burner 10 has a bowl 11 which is disposed in inverted position. A cross-bar 12 is disposed across the mouth of the bowl 11, which opens downward, and is secured at its opposite ends to the edge of the bowl 11. Formed medially from the cross-bar 12 to project downward therefrom is a threaded nipple 13 which is adapted to be threadedly received in a manifold casting, indicated at 14 in Fig. 2. Formed in the nipple 13 is a vertical cylindrical bore 15 which is connected at its upper end to a mixing chamber 17 within the bowl 11, by means of a small hole, in the form of a jet 16. Opening upwardly and centrally from the mixing chamber 17 and formed in the mixing bowl 11 is a hole 18.

Formed upon the upper portion of the mixing bowl 11 is a plurality of burner tubes 20. In the burner 10, the burner tubes 20 are four in number and diverge outward and upward from each other from their lower ends where they are formed integral with the mixing chamber 17. At their outer ends the burner tubes 20 have elbows 21 which form substantially right angle bends in the burner tubes 20, the elbows 21 constituting the upper tips of the burner tubes 20 and being disposed in the axial plane of their respective burner tubes 20 and pointing inward towards a single point "P" located upon the vertical axis of the burner 10. Central passageways 24 are formed within the burner tubes 20 so as to communicate between the hole 18 and the tips of the burner tubes 20.

In the use of the burner 10, gas is admitted under pressure to the interior of the manifold casting 14 from which gas passes upward through the bore 15 and is emitted with considerable velocity from the jet 16. The stream of gas, thus emitted, passes upward through the chamber 17 of the mixing bowl 11, through the hole 18, through the passages 24, and out of the tips of the burner tubes 20. As this gas passes through the mixing chamber 17, it is mixed with air in this chamber which is drawn into this chamber through the open portions 29 of the mouth of the bowl 11, disposed on opposite sides of the cross-bar 12. When the mixture of gas and air, which is caused to pass upward through the burner tubes 20, is discharged from the tips of these tubes, streams of gas and air mixture are caused to follow the paths indicated by the lines 30 which intersect at the point "P". When the streams of gas and air mixture thus directed to intersect at the point "P" are ignited, an extremely high temperature is reached at the point "P". This high temperature results in the complete combustion of the gas in the mixture and produces a much hotter flame for combustion of a given quantity of gas than is obtained in the usual type of burner.

As is clearly shown in Figs. 2 and 3, the edges 32 of the walls of the mixing bowl 11 are disposed at a higher level than the upper face of the cross-bar 12. This makes it possible, where several burners 10 are used in a battery, to observe which of the burners, if any, are "back-firing" or burning the gas as it proceeds from the jet 16. Thus in a battery of burners having separate controls, it will not be necessary to extinguish the entire battery of burners in order to correct the "back-firing" of a single burner.

I claim as my invention:

1. A gas burner, comprising: a substantially hemispherical mixing bowl; a cross-bar formed across the mouth of said bowl, the mouth of said bowl being open on opposite sides of said bar; a nipple formed upon said cross-bar, there being a passage for gas formed through said nipple and said cross-bar whereby a stream of gas is projected into said mixing bowl; and a plurality of burner tubes connecting with the upper portion of said mixing bowl and diverging from their point of connection, the ends of said tubes being turned inward so that all the burning streams of gas directed from said tubes meet at a point upon the axis of said burner.

2. A gas burner, comprising: a substantially hemispherical mixing bowl; a cross-bar formed across the mouth of said bowl, the mouth of said bowl being open on opposite sides of said bar, and being disposed at a higher level than the upper face of said cross-bar to cause said face to be visible from substantially the same level as said burner; a nipple formed upon said cross-bar, there being a passage for gas formed through said nipple and said cross-bar whereby a stream of gas is projected into said mixing bowl; and a plurality of burner tubes connecting with the upper portion of said mixing bowl and diverging from their point of connection, the ends of said tubes being turned inward so that all the burning streams of gas directed from said tubes meet at a point upon the axis of said burner.

3. A gas burner, comprising: a substantially hemispherical mixing bowl; a cross-bar formed across the mouth of said bowl, the mouth of said bowl being open on opposite sides of said bar; a nipple formed upon said cross bar, there being a passage for gas formed through said nipple and said cross bar whereby a stream of gas is projected into said mixing bowl; and a battery of four burner tubes connecting with the upper portion of said mixing bowl and diverging from their point of connection, the ends of said tubes being turned inward so that all the burning streams of gas directed from said tubes meet at a point upon the axis of said burner.

In testimony whereof, I have hereunto set my hand at Los Angeles, California, this 25th day of June, 1926.

WILLIAM B. BASTIAN.